United States Patent [19]
Tajima et al.

[11] Patent Number: 5,432,644
[45] Date of Patent: Jul. 11, 1995

[54] DISK DRIVE UNIT HAVING MOTOR COMPONENTS IN A COMPACT ARRANGEMENT

[75] Inventors: Fumio Tajima, Juo; Hiroshi Kanazawa; Hiroshi Katayama, both of Hitachi; Kazuo Ohnishi, Kasukabe; Tadashi Takahashi, Hitachi; Nobuyoshi Mutoh, Katsuta; Shigeki Morinaga, Hitachi; Nobuyoshi Tsuboi, Toukai; Hideki Nihei, Hitachioota, all of Japan

[73] Assignees: Hitachi, Ltd.; Japan Servo Co., Ltd., both of Tokyo, Japan

[21] Appl. No.: 249,659

[22] Filed: May 26, 1994

Related U.S. Application Data

[63] Continuation of Ser. No. 852,665, Mar. 17, 1992, abandoned.

[30] Foreign Application Priority Data

Mar. 19, 1991 [JP] Japan ................................. 3-054336
May 9, 1991 [JP] Japan ................................. 3-104115

[51] Int. Cl.⁶ .................................................. G11B 5/016
[52] U.S. Cl. .................................... 360/99.04; 310/156; 360/99.08
[58] Field of Search ............... 360/99.04, 99.08, 98.07, 360/99.12, 99.05; 310/156, 254, 67 R, 216, 256

[56] References Cited

U.S. PATENT DOCUMENTS

| | | | |
|---|---|---|---|
| 4,359,763 | 11/1982 | Hoffman | 360/99.04 |
| 4,581,667 | 4/1986 | Gerfast | 360/99.12 |
| 4,600,864 | 7/1986 | Sato | 310/156 |
| 4,620,301 | 10/1986 | Koide | 360/99.08 |
| 4,873,596 | 10/1989 | Harada | 360/99.04 |
| 4,883,996 | 11/1989 | Aoki | 310/254 |
| 5,063,318 | 11/1991 | Anderson | 310/156 |
| 5,140,210 | 8/1992 | Shirakawa | 310/156 |

Primary Examiner—A. J. Heinz
Attorney, Agent, or Firm—Antonelli, Terry, Stout & Kraus

[57] ABSTRACT

A motor has a stator and a rotor, the stator having cores and drive coils which generate magnetic fields for rotating the rotor. The stator also has a yoke surrounding the rotor and the rotor is positioned such that it is closer to one part of the outer periphery of the yoke than another part of the outer periphery of the yoke. Such a motor is particularly suitable for use in a disk drive unit as a spindle motor for rotating the disk. Then an actuator for moving a head may be located adjacent the part of the outer periphery of the yoke which is closest to the rotor. This permits the head to approach closely the axis of rotation of the disk without the spindle motor interferring with the movement of the head. The continuous yoke prevents magnetic flux leakage from the spindle motor interferring with the actuator. The actuator may itself have a yoke integral with the yoke of the spindle motor, and/or other components in common.

11 Claims, 9 Drawing Sheets

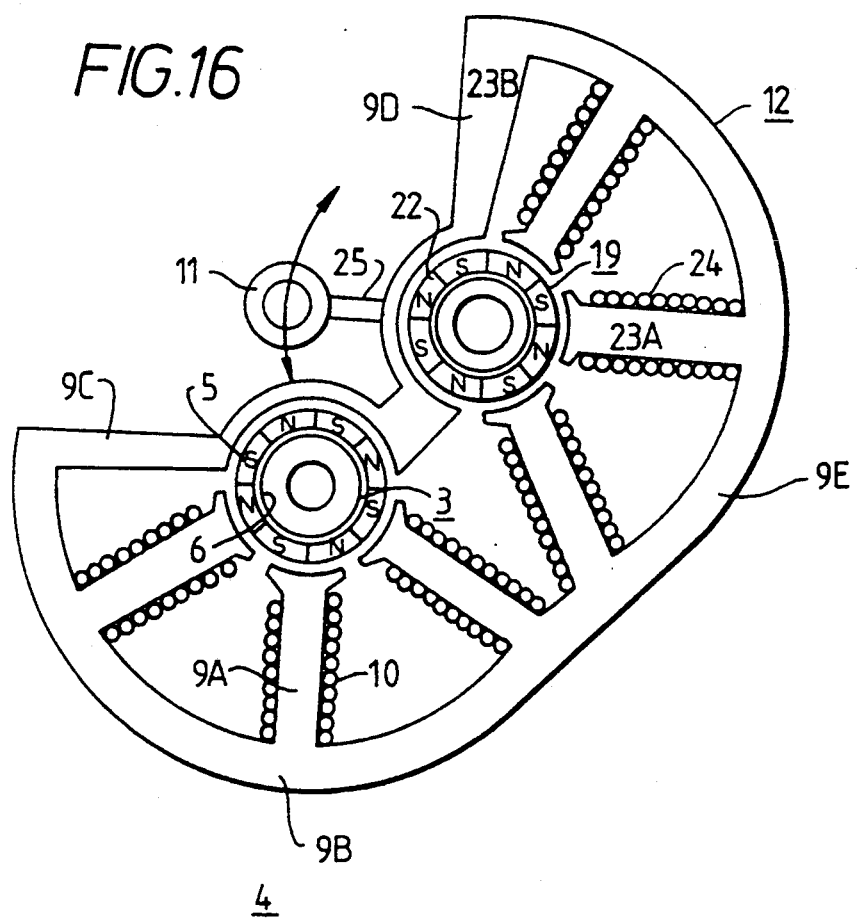

DISK DRIVE UNIT HAVING MOTOR COMPONENTS IN A COMPACT ARRANGEMENT

This application is a continuation application of Ser. No. 07/852,665 filed Mar. 17, 1992, which is now abandoned.

BACKGROUND OF THE INVENTION

1. Field of the Invention

The field of the invention relates to a motor and to a disk drive unit having such a motor.

2. Summary of the Prior Art

A disk drive for a magnetic or optical disk normally has, a spindle motor for rotating the disk support, a head for reading or writing information to or from the disk, and an actuator for moving the head relative to the rotation axis. By suitable combination of disk rotation and head movement, data on the disk can be scanned by the head. Normally, both the spindle motor and the head actuator are located on the same side of the disk.

Improvements in disk technology have permitted the size of disks to be reduced, but this has resulted in the diameter of the disk becoming comparable with the diameter of the spindle motor. If the spindle motor is located directly below the disk support, the obstruction presented by the spindle motor limits the amount of the disk that can be scanned by the head. If, on the other hand, the spindle motor is spaced from the disk support by a distance sufficient to permit the head to pass therebetween, the size of the disk drive perpendicular to the plane of the disk is increased. A similar disadvantage occurs if the diameter of the spindle motor is reduced, since then its length perpendicular to the disk needs to be increased in order to provide a suitable drive force.

It has also been proposed to make use of an induction motor with an open section, and the actuator for head movement then being aligned with that open section to permit the head to be moved within the open section, and so closer to the axis of rotation than would otherwise be possible.

SUMMARY OF THE INVENTION

The present invention has several aspects. The first aspect considers the arrangement mentioned above in which an induction motor had an open section, and proceeds from the realisation that such an arrangement causes magnetic flux leakage from the spindle motor which may interfere with the (normally magnetic) actuator for head movement. The first aspect of the present invention therefore proposes that a motor be provided in which the yoke of the motor stator extends continuously around the rotor thereof. Standard stators also have yokes extending around the rotor, but with the rotor being centrally located. In this aspect of the present invention, the rotor is located within the stator such that its rotation axis is closer to one part of the outer periphery of the yoke than another.

The term "yoke" in the present specification is used to identify the part or parts of the stator which do not generate magnetic fields for driving the rotor. Of course, the stator will also need means for generating those fields, normally provided by stator cores and associated drive coils.

Thus, the first aspect of the present invention proposes that the rotor be close to one part of the periphery of the yoke. In a simple case, the yoke could be circular and the rotor axis then off-set from the centre of that circle. However, the preferred arrangement is for the yoke to have an arc part and a straight part linking the ends of the arc part so that the yoke is in the form of a major sector of a circle. The rotor may then be placed at the centre of the curvature of the curved part with the straight part extending substantially tangential to the rotor. Other alternatives involve elliptical yokes or yokes in the form of major segments of a circle.

There are several optional features which may be used with the first aspect of the present invention. Normally, the drive to the rotor has a plurality of cores which extend from the yoke towards the rotor, with those cores having associated field coils for generating magnetic fields in the cores. Preferably, such cores are not provided on that part of the yoke which is closest to the rotor. Indeed, it is preferable that the inner surface of that part of the yoke is spaced from the rotor by the same distance as the ends of the cores closest to the rotor. This then ensures that the part of the yoke which is close to the rotor gives good magnetic shielding.

Furthermore, it has found that a cogging torque may develop in the rotor, and to overcome this it is preferable that the inner periphery of the yoke which is close to the rotor has grooves therein, which grooves extend into the yoke and indeed may extend completely therethrough, to form slots.

This first aspect of the present invention is particularly applicable to an arrangement in which the rotor makes use of permanent magnets.

Such an arrangement, when applied to a disk drive, permits the head actuator to be aligned with that part of the periphery which is closest to the rotor. This way, the head can be moved as close as possible to the axis of rotation of the disk, without requiring a gap between the disk support and the spindle motor.

It can be noted, in this aspect, that the fact that the yoke extends continuously around the rotor prevents magnetic flux from the motor interfering with, for example the head actuator.

As was mentioned above, the first aspect of the present invention is particularly applicable to an arrangement in which the rotor makes use of the permanent magnets. In existing disk units, it is known to provide a separate magnet which interacts with a magnetic region on the disk for holding the disk on the disk support. In such existing proposals, the magnet used for holding the disk on the support is entirely separate from .magnets of the motor, and indeed there may be magnetic shielding therebetween. It has been appreciated that it is possible to make use of the magnet of the motor, and in particular permanent magnets of a rotor, for holding the disk on the support, by ensuring that there is direct magnetic linkage between those permanent magnets and the magnetic region of the disk. This use of direct magnetic linking holding the disk is therefore a second, independent, aspect of the present invention. However, it is possible to use the first and second aspects in combination.

In existing disk drives, the spindle motor and the head actuator may be mounted on a common support, but normally have no components in common. The third, fourth and fifth aspects of the present invention propose that at least some of the components should be integral.

In the third aspect, it is proposed that the spindle motor and the head actuator have a common yoke. The result is a more compact arrangement.

It is particularly advantageous if the first and third aspects are combined, since then the part of the yoke bridging the spindle motor and head actuator is proximate the disk rotation axis, so that it does not significantly interfere with the head actuator movement. Such an arrangement may be used either when the head actuator is a linear actuator, or where it is an actuator which moves the head in a curved locus.

In the fourth aspect of the present invention, the drive coils of the spindle motor and of the actuator are mounted on a common substrate. This may be achieved, for example, by providing an insulating substrate with a conductive film thereon, and etching that film to provide conductive tracks of suitable shape. Again, this permits a compact arrangement to be achieved. It is also possible for the drive coils of the spindle motor and head actuator to be electrically interconnected in common.

Other arrangements are possible in which parts of the spindle motor and head actuator have integral parts.

In existing disk drives, the rotational position of the disk is determined by a sensor which detects the position of the rotor of the spindle motor. However, if such detection is to be accurate, that sensor must be sensitive and hence expensive.

Therefore, the sixth aspect of the present invention proposes that a sensor be provided which detects positional information recorded around the periphery (normally the entire periphery) of the disk. The position of information derived by that sensor may then be used to control the motor.

Such an arrangement then requires the recordal of positional information around the periphery of the disk, and it may first be necessary to record that information. This can be achieved by first measuring the disk position using a sensor which monitors the rotor of the disk, and recording the positional information accordingly. At first sight, this would then require a sensitive sensor of rotor movement. In fact, this is not necessary since the recorded data need not correspond exactly to the rotor position, since, after recording it gives a precise disk position. Since, provided the information varies around the disk, it is possible subsequently to make use of that information accurately, even if the information itself does not accurately relate to the rotor position.

BRIEF DESCRIPTION OF THE DRAWINGS

Embodiments of the present invention will now be described in detail, by way of example, with reference to the accompanying drawings, in which:

FIG. 16 is a top view of another disk drive unit being an eighth embodiment of the present invention.

DETAILED DESCRIPTION

Figure 1:
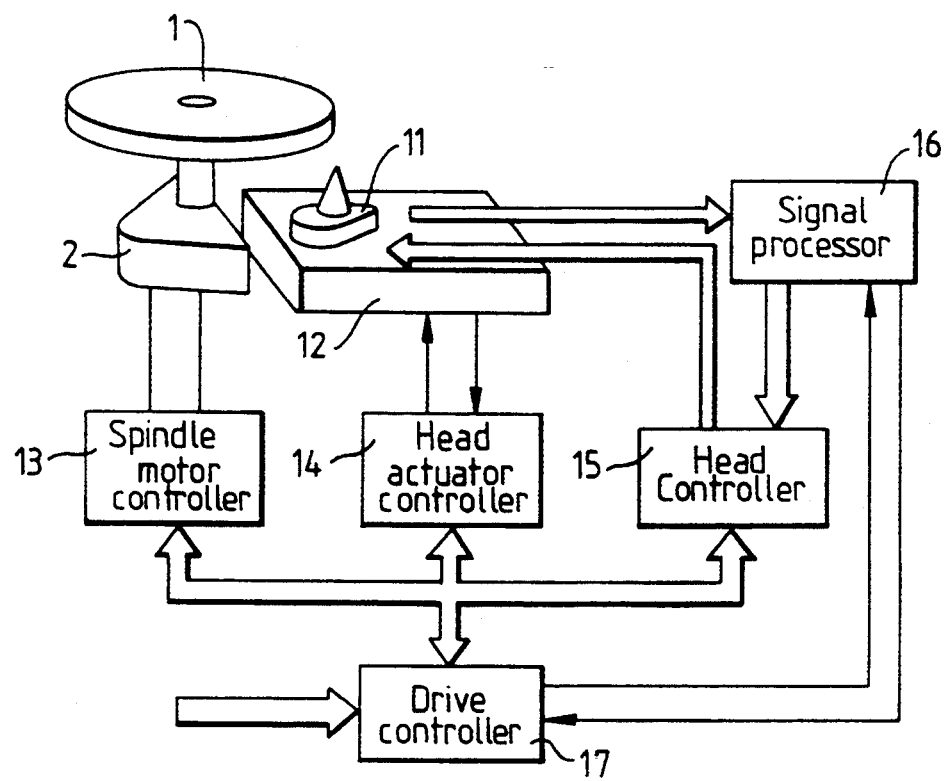
FIG. 1 shows schematically the configuration of an optical disk apparatus in which the present invention is embodied.

FIG. 1 shows a first embodiment of the invention as applied to an optical disk apparatus. FIG. 1 shows an optical disk 1 for performing at least one of the operations of recording, reading and erasure of information; a spindle motor 2 for directly driving the optical disk; an optical head 11 for performing at least one of the operations of recording, reading or erasing information to and from the disk 1; a head driving actuator 12 consisting of a linear motor to move the head in the radial direction of the disk; a controller 13 for the spindle motor 2; a controller 14 for the head driving actuator 12; a controller 15 for the head 11; a signal processor 16 for the disk; and a drive controller 17 that controls the other components 13 to 16.

The spindle motor controller 13 supplies a motor current to the spindle motor 2 to drive the spindle motor 2 at a specified constant speed. The controller 14 controls the position of the head driving actuator 12 according to a position command and a position signal from a position sensor (not shown) of the head driving actuator 12. The controller 15 for the optical head 11 controls the locus of the head 11 according to the locus information obtained from the signal processor 16. The signal processor 16 sends signals to the optical head controller 15 to enable it to control the optical head 11 at an appropriate position according to the information from the optical head 11. The signal processor 16 also supplies signals to the drive controller 17.

On the basis of signals external circuits, the drive controller 17, operates the spindle motor controller 13, the head driving actuator controller 14 and the head controller 15 and communicates with these controllers to keep track of the moving operations of moving parts. In this way, the drive controller 17 the performs system control of the optical disk apparatus.

A first feature of this embodiment of the present invention is that the spindle motor directly drives the optical disk. The distance from the center of the rotor to the outer periphery of the stator changes with the angle, with the minimum distance set less than the innermost radius of the disk recording section. This allows the head driving actuator, which drives the head in the radial direction of the disk, to be arranged below the disk.

Figure 2:
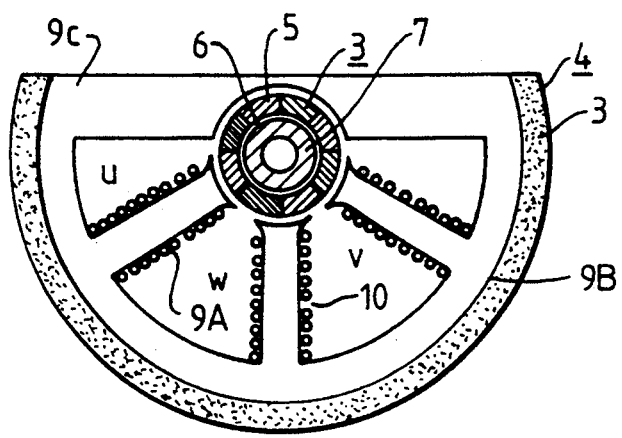
FIG. 2 shows the structure of a spindle motor used in the optical disk of one embodiment of the present invention.
Figure 3:
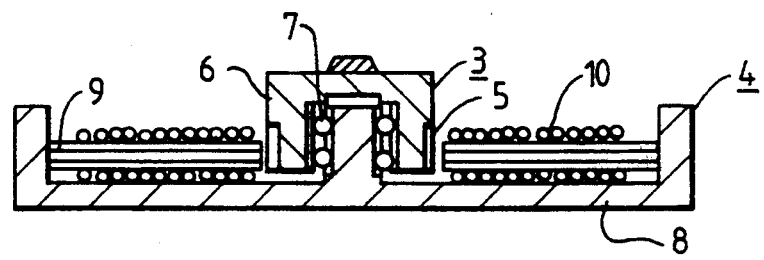
FIG. 3 is a cross section of the spindle motor of FIG. 2.

FIG. 2 shows the construction of the disk driving spindle motor of this invention, and FIG. 3 shows a cross section of it. The spindle motor 2 is a brushless motor which has permanent magnets in the rotor and three-phase coils u, v, w in the stator that form rotating fields. A rotor 3 consists of permanent magnets 5 and a rotor yoke 6. The permanent magnets 5 have their N and S poles arranged alternately at equal pitch in the circumferential direction and the rotor yoke 6 forms a magnetic circuit on the rotor side. A stator 4 includes of a case 8, a stator core 9 (magnetic core 9A, curved stator yoke part 9B and straight-circuit yoke part 9C), and coils 10 (u, v, w phases) wound on the magnetic core 9A. The stator 4 supports the rotor 3 for rotation via a bearing 7. A feature of this embodiment is that the distance from the center of the rotor 3 to the outer periphery of the stator varies according to the angle, the shape of the stator being almost semicircular as shown in FIG. 2. FIG. 2 represents the case in which a portion of the stator periphery whose distance from the center of the rotor 3 changes according to the angle is linear.

The structure of the stator core 9 is as follows. Where the distance between the center of the rotor 3 and the outer periphery of the stator is large, the magnetic core 9A with the coil 10 is located so as to face the rotor 3 with a gap therebetween, with the rear portion of the magnetic core 9A magnetically coupled to the stator yoke part 9B. Where the distance from the rotor center to the curved stator outer periphery is small, the coil 10 or magnetic core 9A are not provided but instead of the straight short-circuit yoke part 9C is provided enclosing the rotor with a gap therebetween. Both ends of the short-circuit yoke part 9C are magnetically coupled to the curved stator yoke part 9B so that the two short-circuit yoke parts 9B, 9C surround the rotor, and are in the shape of a major sector of a circle.

With this construction, the magnetic core 9A with the coil 10 constitutes a torque generating section which generates a driving torque by the electromagnetic force acting between the current flowing in the coil 10 and the permanent magnet 5 of the rotor 3. The short-circuit yoke part 9C that has no coil 10 does not produce a torque and constitutes a no-torque generating section. The short-circuit yoke 9C, unlike the conventional construction, has a magnetic shield function of preventing the magnetic flux generated by the permanent magnets 5 of the rotor 3 and the coil 10 from leaking out (this is particularly important with the spindle motor that drives the magnetic disk). It also has a function of reducing the cogging torque acting between the permanent magnets 5 of the rotor 3 and the stator core 9, and a function of preventing damage to the head and the permanent magnet rotor due to uncontrolled action of the head driving actuator.

With this embodiment, since a brushless motor is used for the spindle motor that directly drives the disk, the torque density is increased. The increased torque density allows a no-torque generating section to be provided in a part of the stator without producing adverse effects on the reduction in the size and weight of the motor. By reducing the distance from the rotor center to a part of the stator outer periphery where no torque is generated, it is possible to arrange the head driving actuator in this part, reducing the thickness of the disk apparatus because there is no need to place the head driving actuator between the disk and the motor.

When the stator is formed of one no-torque generating section and one torque generating section as shown in FIG. 2, the space outside the outer periphery of the torque generating section (in this case, the space in which the head 11 or the head actuator moves) can be large. Another advantage is that the construction is simple, with the torque generating section made up of as few as three coils for driving the rotor.

Since the head actuator side of the stator in the brushless motor, which contains a permanent magnet rotor, is magnetically shielded by the core, there is no opening, either structural or magnetic, preventing damage to the head and rotor due to erroneous operation of the head and improving the reliability. This construction removes variations in the leaking magnetic flux in the permanent magnet rotor, reducing the cogging torque in the spindle motor. Moreover, the head is no longer affected by the leaking magnetic flux of the permanent magnet rotor. All these combine to improve the accuracy of the positioning of the head.

In the above embodiment, the spindle motor has an almost semicircular shape, and the part where the distance from the center of the rotor 3 to the stator outer periphery changes according to the angle is linear. However, this part need not be linear and may have any shape that provides a space sufficient to accommodate the head driving actuator 12. The constructions such as those shown in FIG. 4 and 5 also produce the similar effects.

Figure 4:
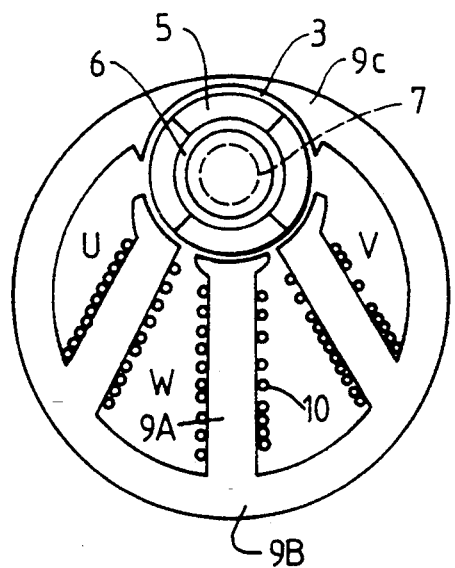
FIG. 4 shows the structure of a spindle motor of a second embodiment of the present invention.

FIG. 4 shows another embodiment of the spindle motor according to this invention. This embodiment differs from the brushless motor of FIG. 2 in that the stator core is elliptical and the head driving actuator is as close to the rotor center as possible. The stator structure of the spindle motor on the head driving actuator side is that the rotor is surrounded, with a gap, by a curved short-circuit yoke part 9C as a magnetic core with no coil. The short-circuit yoke part 9C magnetically couples with the rest of the stator yoke part 9B so that the stator yoke parts 9B, 9C surround the rotor.

Figure 5:
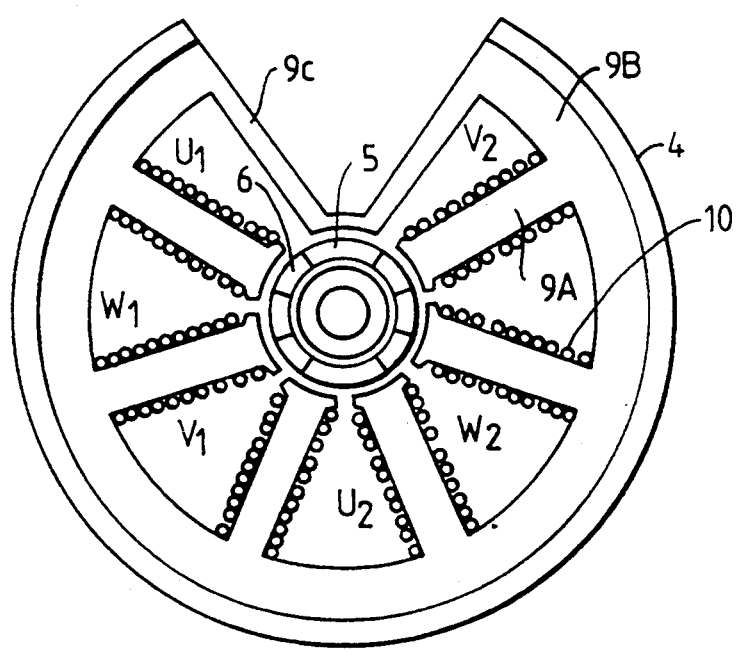
FIG. 5 shows the structure of a spindle motor of a third embodiment of the present invention.

FIG. 5 shows yet another embodiment of the spindle motor according to this invention. This embodiment differs from the brushless motor of FIG. 2 in that the short-circuit yoke part 9C has a near V shape. The two yoke parts 9B, 9C thus form the major segment of a circle surrounding the rotor, with the rotor axis at the center of the circle. With this construction the area of the torque generating section of the stator, which surrounds the rotor and is made up of the magnetic core 9A with the coil 10, becomes larger than the no-torque generating section with no coil. This further reduces the motor size.

As seen in FIG. 5, the range of angle of the torque generating section is larger than that of the no-torque generating section, contributing to an increase in the torque.

A key feature to reducing the disk apparatus in size, weight and thickness is the distance between the center of the rotor and the innermost periphery of the stator core in the spindle motor 2. In other words, it depends on how small the radial length or thickness of a bridge part at the center of the short circuit stator yoke part 9C with no coil 10 can be made. However, if the bridge part has too small a thickness, there will then be the possibility of magnetic saturation and therefore a cogging torque. The bridge should therefore have the minimum thickness that does not cause magnetic saturation of the fluxes linking this part. To meet this requirement and still make the bridge thickness smaller requires a motor construction in which the rotor has multiple poles to reduce the amount of flux in the stator yoke. The number of the poles is preferably eight or more, as will now be explained.

The relationship between the number of coil phases of the stator and the number of magnetic poles of the rotor in the brushless motor may be selected to generate an effective torque. Generally, a 3-phase motor has three magnetic poles 9A with the coil 10 in the drive portion of the torque Generating section. Hence, there have to be at least four poles of the permanent magnet 5 in the rotor 3 that work with these magnetic poles of the stator. That is, the ratio between the numbers of stator magnetic poles and the rotor magnetic poles should be selected at 3:4N (N: 1, ..., n). With this ratio selected, the cogging torque is reduced.

Next, the invention will be explained in terms of how to reduce the cogging torque and therefore the pulsating rotation of the rotor.

For precise recording on the disk 1, the variations in rotation of the spindle motor 2 should preferably be as small as possible. Acting as hindrance to this object is the cogging torque in a permanent magnet brushless motor which is caused by variations in the attractive force between the permanent magnets 5 and the magnetic cores 9A. This cogging torque must be reduced. This is particularly significant with the brushless motor of this invention in which the torque Generating section and the no-torque Generating section are close together.

Consider first the process of Generation of the cogging torque in the structure of the rotor 3 and the stator 4 as shown in FIG. 2. In the conventional structure, in which the stator 4 (magnetic poles provided over the entire circumference) has six poles and the rotor 3 has eight poles, the cogging torque is generated 24 times for each rotation of the rotor 3. (24 is the least common multiple of eight for the permanent magnetic pole number and six for the stator magnetic pole number.)

Consider the brushless motor of this invention. The permanent magnet with eight poles and the torque generating section, or half the entire circumference of the stator, with three magnetic poles also generate 24 pulses in the torque during one rotation of the rotor. On the other hand, eight torque pulses are generated in one rotation between the permanent magnet 5 with eight poles and the no-torque generating section.

Generally, the cogging torque decreases in magnitude will increase in the number of pulses during one rotation. In the construction of this invention, the eight torque pulses in one rotation constitute a dominant cogging torque.

Figure 6:
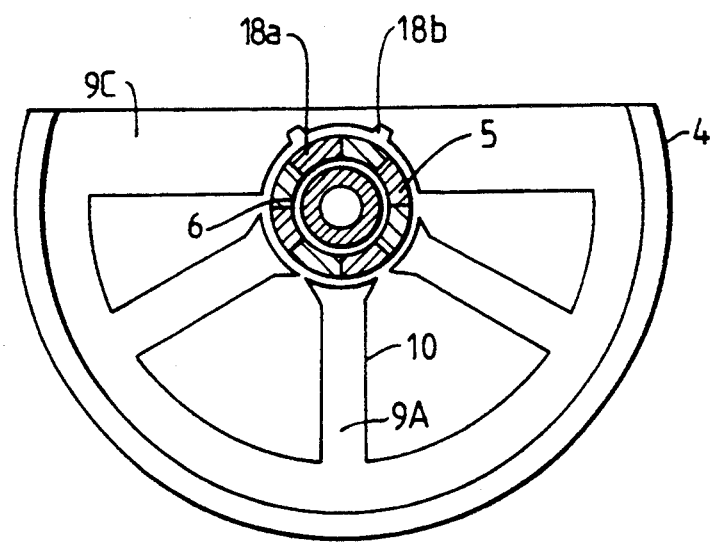
FIG. 6 shows the structure of a spindle motor with auxiliary grooves, being a fourth embodiment of the present invention.

FIG. 6 shows an embodiment designed to reduce the cogging torque in the motor of this kind according to this invention. Components identical to those of FIG. 2 are indicated by the same reference numerals. This embodiment differs from that of FIG. 2 in that auxiliary grooves 18a, 18b are formed in a part of the inner circumferential surface of the straight stator yoke part 9C with no coil 10 that faces the permanent magnets 5. The auxiliary grooves 18a, 18b have the same width as the magnetic core 9A which has the coil 10, and their intervals are preferably 60 degrees. With this construction there are apparently six magnetic pole on the stator side, so that 24 pulses in the torque are produced during one rotation between the eight poles of rotor 3 and the six poles of the stator, thus reducing the cogging torque.

Figure 7:
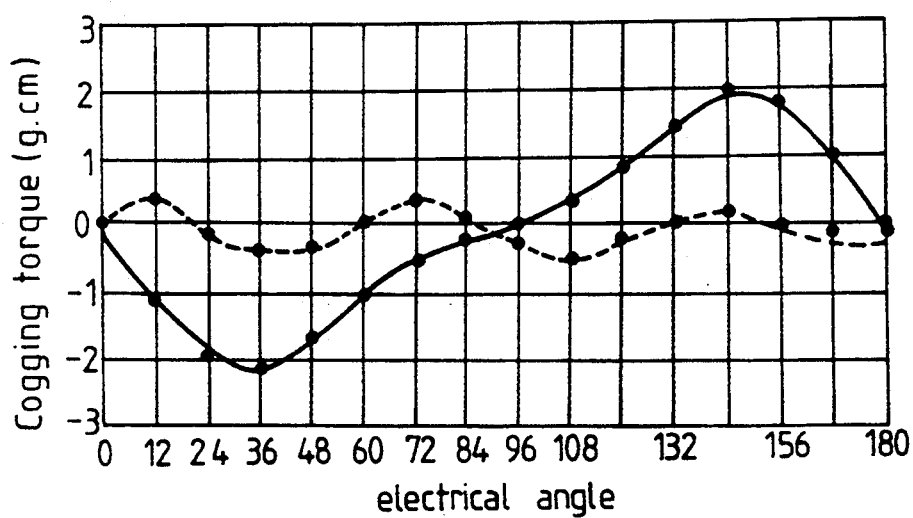
FIG. 7 is a diagram showing the reduction in cogging torque achieved by auxiliary grooves in the fourth embodiment of FIG. 6.

FIG. 7 shows the effectiveness of the auxiliary grooves in reducing the cogging torque produced in the stator core structure of FIG. 6, illustrating the magnitudes of cogging torques produced with and without the auxiliary grooves. In the case of line a without auxiliary grooves, there is one pulses in the torque at an electrical angle of 180° and such a pulses occurs eight times during one rotation. In the case of line b with the auxiliary grooves, there are three pulsations at 180° and a total of 24 pulses occur during one rotation. In terms of amplitude of pulses, it is seen that the cogging torque is reduced by the auxiliary grooves 18a, 18b.

The auxiliary grooves may pierce through the stator from the inner circumference to the outer circumference. In other words, the effectiveness of this invention can be achieved also by providing slits in the stator yoke 9C with no coil 10. In this case, it is preferable that the width of the slit be generally less than two times the winding groove (a groove between the magnetic cores 9A with coil 10) in order to prevent leakage of the flux of the permanent magnets 5 toward the head driving actuator 12. The cogging torque reduction effect can be improved by arranging the grooves at equal intervals as shown in FIG. 6 and by making the widths of the winding grooves equal to those of the slits.

The cogging torque reduction effect can further be increased by winding a few turns of driving coil in the auxiliary grooves to form a torque generating section.

In this embodiment, the head actuator side of the stator in the brushless motor, which has a permanent magnet rotor, is magnetically shielded by the core and therefore has no opening, either structural or magnetic, preventing damage to the head and rotor that may occur from erroneous operation of the head, enhancing reliability. Further, there are no longer variations in the leaking flux from the permanent magnet rotor, reducing pulses in the rotation of the spindle motor. This in turn eliminates the effects on the head of the leaking flux from the permanent magnet rotor and therefore improves the accuracy of head positioning.

Figure 8:
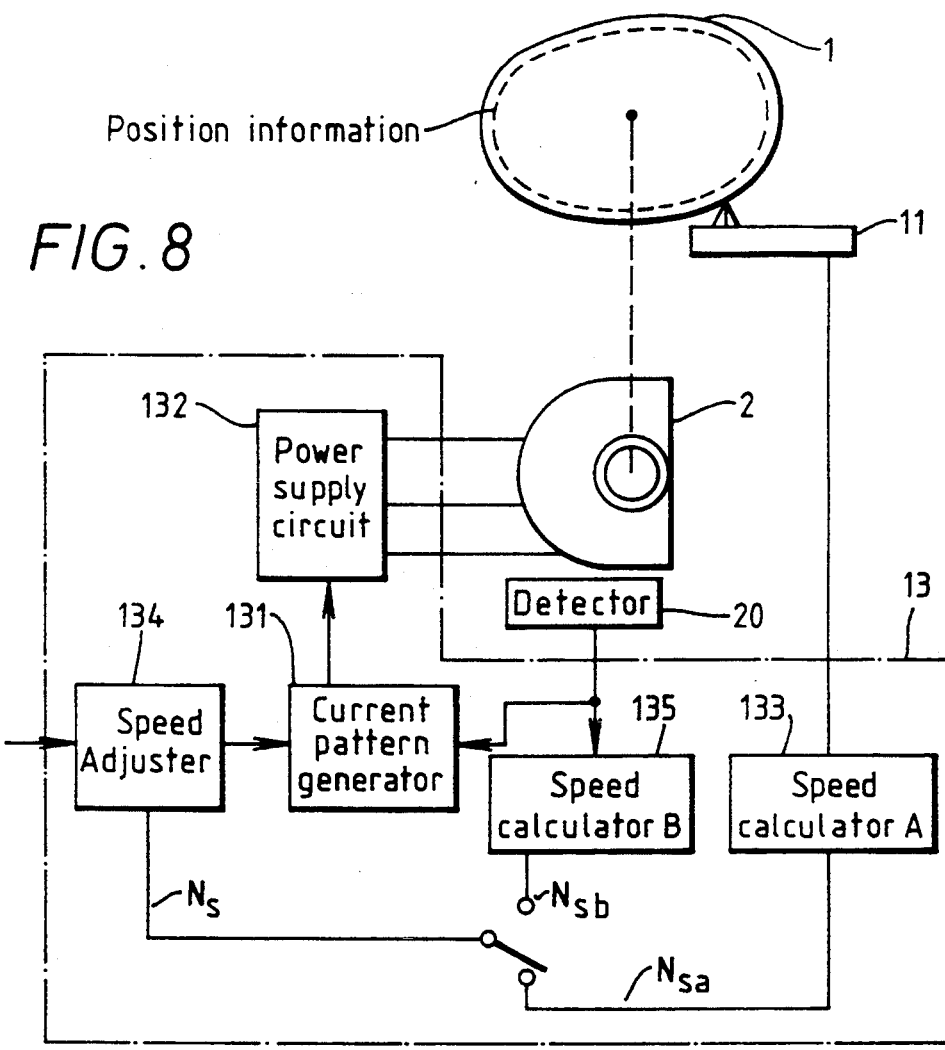
FIG. 8 shows the construction of a control device for the spindle motor which may be used in this invention.

Another embodiment of this invention for a spindle motor rive system is shown in FIG. 8. The figure shows a drive system when a brushless motor 2 is used for the spindle motor. The brushless motor requires supply of motor current in synchronism with the rotor. For this purpose, a rotor position detector 20 is provided and, according to the position signal, a current pattern generator 131 produces a 3-phase current pattern signal. Based on this pattern signal, an ac power supply circuit 132 supplies 3-phase current to the brushless motor 2.

The speed control of the brushless motor 2 will now be described follows. The position information recorded over the entire periphery of the disk 1 is read by the head 11, and a speed calculator A 133 calculates from this position information an actual speed $N_{sa}$, which is sent to a speed adjuster 134. The speed adjuster 134 outputs a command signal of current and phase such that the actual speed will match a speed command value $N_f$. The command signal is sent to the current pattern generator 131 to control the current and phase of the motor current.

When no position information is prerecorded over the entire periphery of the disk 1, a speed calculator B 135 determines from a position signal from a rotor position detector 20 the actual speed of rotation $N_{sb}$, which is used to start the motor to record the position information over the entire periphery of the disk 1. After this, during normal operation, the motor speed control is carried out according to the position information from the disk 1.

With this invention, since the position information of the rotor recorded on the disk is used to improve the resolution of the position information, the control of the speed of the spindle motor according to this information can be improved in terms of the precision and responsiveness.

Figure 9:
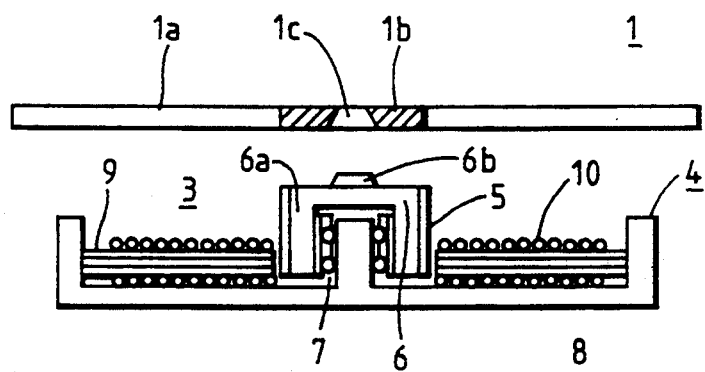
FIG. 9 shows the structure of a disk holding device of a fifth embodiment of this invention.

A further embodiment of this invention for a disk retainer device is shown in FIG. 9. In FIG. 9 components identical to those of FIG. 3 are indicated by the same reference numerals.

The disk 1 (used for at least one of the operations—recording, reading and erasing of information) consists of a recording medium portion 1a and a support portion 1b. The support portion 1b is formed of a magnetic material and has a hole 1c. A rotor yoke 6 of the rotor 3 that supports the disk 1 forms a magnetic path for the permanent magnets 5 and has a projection 6b that, together with the hole 1c in the disk 1, firmly fixes the disk 1 to the rotor 3. The magnetic flux of the permanent magnets 5 on the side of the disk 1 links the support portion 1b of the disk 1 and the rotor yoke 6a, thereby attracting and fixing the disk 1 to the rotor 3. If the permanent magnets 5 are extended axially upwardly as shown, the electromagnetic force generated by the magnetic flux of the permanent magnet 5 and the current flowing in the coil 10 produces a torque acting on the disk 1 on the rotor 3, thus increasing the force that retains the disk on the rotor.

With this embodiment, since a part of the flux of the permanent magnets of the rotor in the spindle motor is used to hold the disk, a dedicated disk holding device is not necessary, reducing the weight and thickness of the disk apparatus.

Another embodiment of this invention for a spindle motor as applied to the disk apparatus will now be explained by referring to FIGS. 10 and 11.

Figure 10:
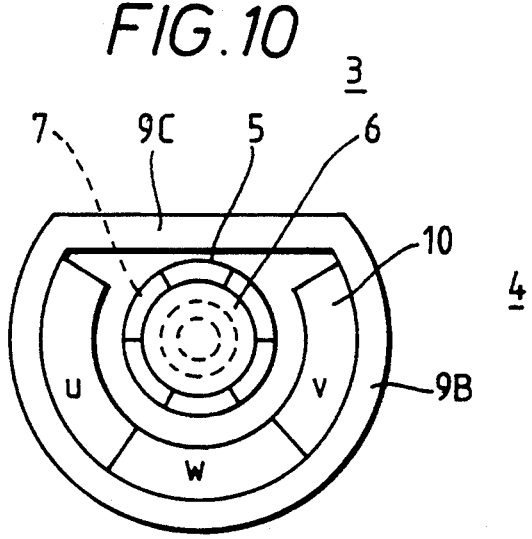
FIG. 10 shows the structure of a coreless motor suitable for use as the spindle motor of the invention.
Figure 11:
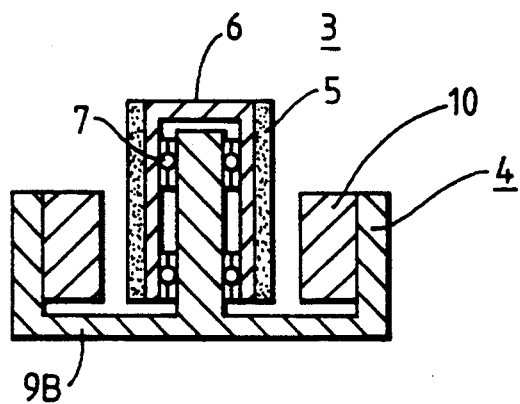
FIG. 11 is a cross section of the coreless motor of FIG. 10.

FIG. 10 shows the structure of a coreless motor used as the spindle motor, and FIG. 11 shows a cross section of the coreless motor. This motor is a coreless type, i.e., a permanent magnet rotor brushless motor in which a coil is wound on the stator magnet pole without using a core, with a radial gap formed between the rotor and the stator poles. The rotor 3 consists of permanent magnets 5 and a rotor yoke 6 that forms a magnetic circuit for the permanent magnets 5. The stator 4 includes a stator yoke 9B, which also serves as a case, and a coreless coil 10. The stator 4 supports the rotor 3 for rotation via bearings 7.

The stator yoke that double as the case consists of an arc part and a straight part 9C as shown in FIG. 10. The coil 10 is only located inside the inner circumference of the arc part 9B of the stator yoke. The coil 10 has three phases u, v, w. Hence, the coil 10 inside the inner circumference of the arc portion of the stator yoke functions as a torque generating section while the linear portion of the stator yoke constitutes a no-torque generating section.

With this embodiment, since the head 11 and the head driving actuator 12 are installed on the linear portion side of the stator yoke, the disk apparatus can be reduced in size, weight and thickness. Furthermore, since no magnetic cores are used, the cogging torque becomes smaller than in motors that have magnetic cores, and the pulsations in rotation are therefore reduced.

Figure 12:
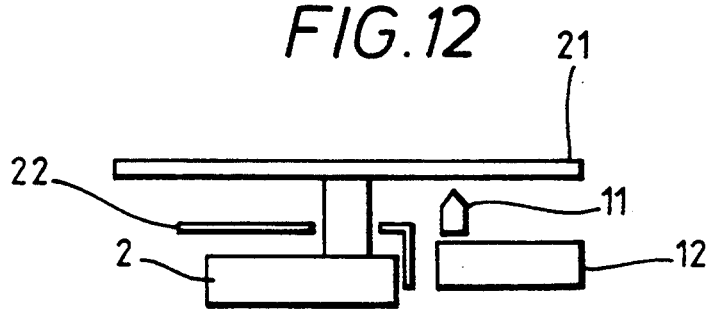
FIG. 12 shows the structure of a magnetic disk apparatus of a sixth embodiment of the present invention.

Next, another embodiment of the invention as applied to a magnetic disk apparatus is shown in FIG. 12. Since the recording medium of the disk is based on magnetism, a magnetic shield plate 22 is provided between the motor 2 and the magnetic disk 21 to protect the disk 21 from influences of the flux generated by the rotor permanent magnets and the stator coil when it is directly driven by the brushless motor.

This embodiment protects the disk against motor flux, so that the spindle motor of this invention can be applied to the magnetic disk apparatus, reducing the size and thickness of the apparatus.

Figure 13:
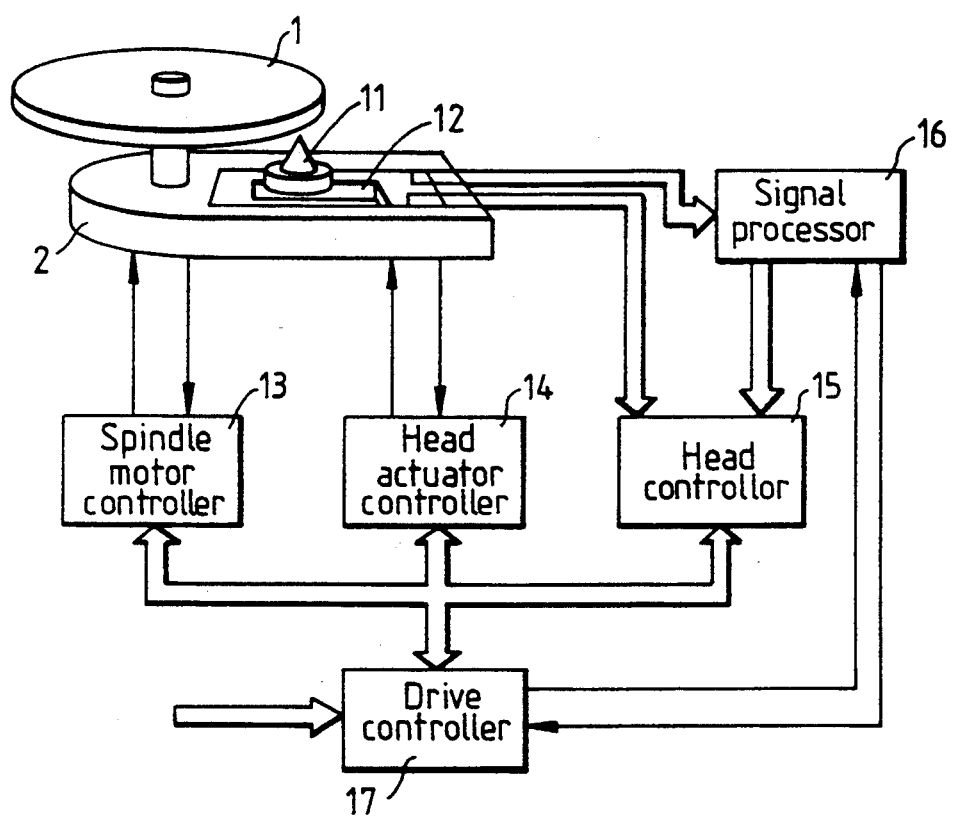
FIG. 13 is a block diagram of an optical disk unit being a seventh embodiment of the present invention.
Figure 15:
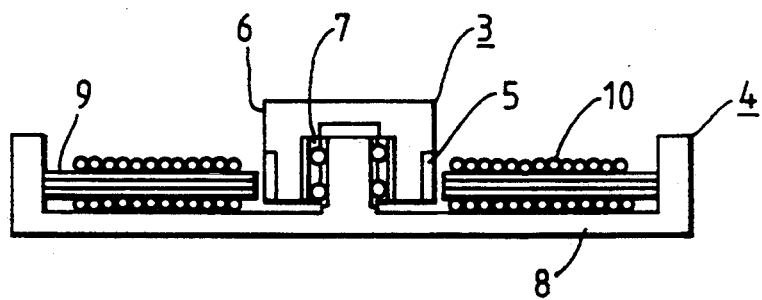
FIG. 15 is a sectional view along the line A—A' in FIG. 14.
Figure 14:
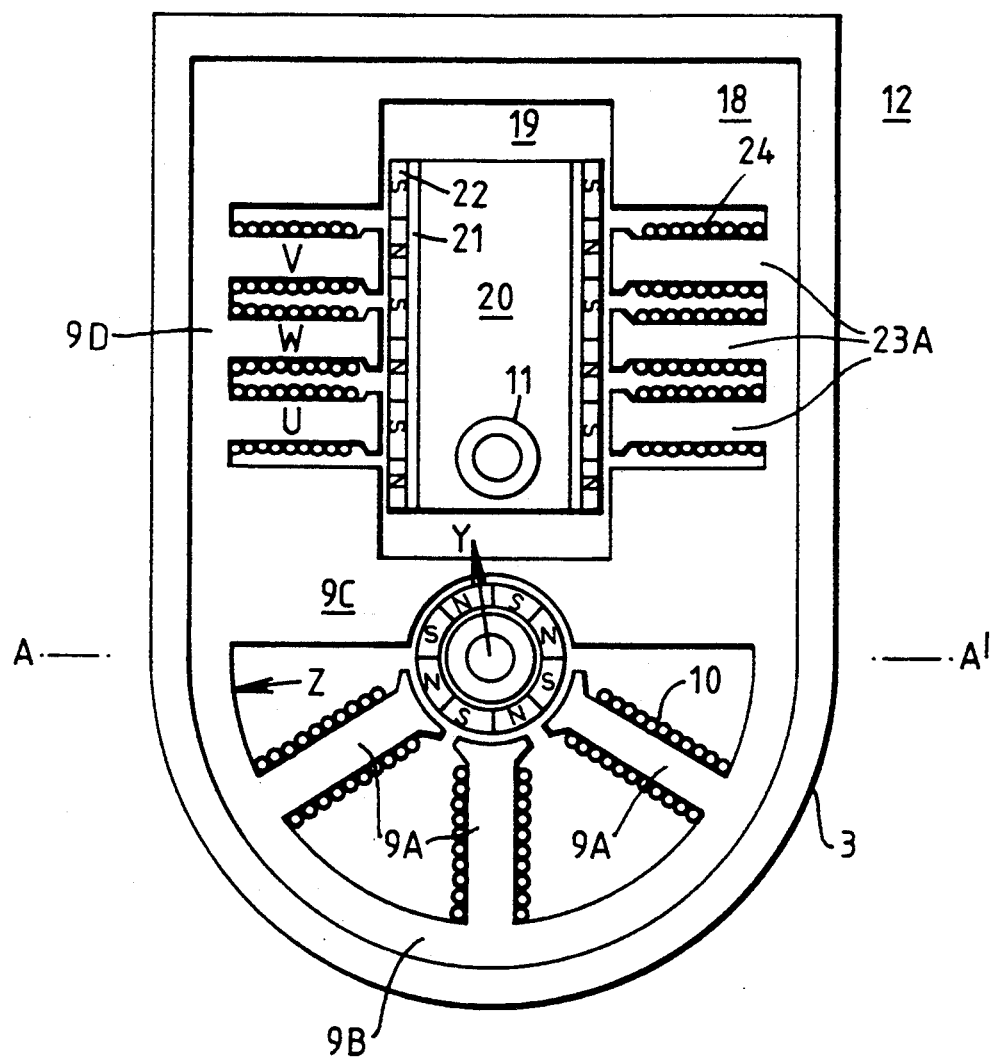
FIG. 14 is a top view of an optical disk drive unit of the embodiment of FIG. 13.

FIG. 13 illustrates another embodiment of the present invention applied to an optical disk unit; FIG. 14 is a structural drawing of a motor incorporating a spindle motor for driving a disk, a head driving actuator and stator cores in the embodiment of the present invention; and FIG. 15 is a sectional view thereof.

FIG. 13 is similar to FIG. 1 and the same reference numerals are used to indicate corresponding parts. FIG. 13 differs from FIG. 1 in the relationship between the yokes of the spindle motor and the head driving actuator. This is shown in more detail in FIG. 14.

In FIG. 14, the distance from the center of the rotor core 9 up to the inner/outer diameter of the stator core 9C (Z in FIG. 14) is made variable with respect to angle, whereby the configuration exemplified therein is linear adjacent the head 11 and circular on the side opposite thereto.

It can be seen that the structure of the spindle motor of FIG. 14 is substantially identical to that of FIG. 2, and the same reference numerals are used. There is a modification (to be described later) to the straight part 9C of the yoke surrounding the rotor, but the curve part 9B, the rotor itself, and the cores 9A and associated coils 10 are the same. Thus, the yoke formed by parts 9B and 9C surrounds the rotor, with the rotor being closer to the part 9C than to the part 9B. Unlike the embodiment of FIG. 2, however, the straight part 9C of the yoke is integral with parts of the head driving actuator 12.

FIG. 15 shows that the optical disk is mounted on the rotor 3 (description of the mounting structure is omitted) so as to construct a direct drive system in which the optical disk is directly driven by the spindle motor 2.

The configuration of the head driving actuator 12 for driving the head 11 will now be described. The spindle motor of the head driving actuator may be, for example, a rotary motor of the reactance or permanent magnet brushless type, or a piezoelectric linear actuator. However, the head driving actuator shown in FIG. 13 is illustrated herein as an example, being a permanent magnet brushless linear motor.

The head driving actuator 12 has a moving element 19 and a fixed element or stator 18. The moving element 19 has a permanent magnet 22 with alternating N and S poles spaced by a substantially equal pitch and a moving element yoke 21 forming a magnetic circuit on the side of the moving element 19. In this case, the moving element 19 of the head feeding actuator 12 is arranged so that it is movable in the radial direction with respect to the spindle motor 2.

On the other hand, the stator 18 has, stator cores 23 as a magnetic material, coils 24 and a stator yoke 9D. As in the case of the spindle motor 2, the stator cores 23 and associated coils 24 generate magnetic poles caused by current flowing through the coil 24 and those poles interact with the permanent magnets 22 of the moving element 19 to generate a drive force. It can be seen that the yoke 9D of the head driving actuator is integral with the yoke 9B,9C of the spindle motor 2. The role of the yokes 9C and 9D is to prevent the magnetic flux created by the permanent magnet 22 and the coils 24 of the moving element 19 from leaking out and simultaneously to lower the cogging torque between the permanent magnet 22 and the stator cores 23 of the moving element 19.

As in the case of the spindle motor 2, a three-phase brushless motor (description of a magnetic pole position detecting element and a bearing mechanism is omitted) has been shown by way of example in FIG. 14 and consequently three of the magnetic cores 23 having drive coils 24 generate force due to their interaction with four poles of the permanent magnet 5 of the rotor 3.

Thus, the spindle motor 2 and the head driving actuator 12 have integrally formed yokes whereby, the assembly accuracy of each part (for example, positioning accuracy of the spindle motor 2 and the head feeding actuator 12) is improved. There may also be a common casing 8. Furthermore, those parts can be made smaller, thinner and lighter. Moreover, at least one of the head 11 and the head driving actuator 19 may be located on the same side of the disk 1 as the spindle motor 2 and the head 11 and/or the head driving actuator 12 may be arranged in the direction of a small angle of the inner diameter of the stator yoke 9C of the spindle motor 2, so that the distance which the head 11 moves in the radial direction may be longer. As the effective area of the disk 1 is thus greater, a high recording density (quantity of information/surface area of disk) becomes available with the effect of making the disk unit smaller, thinner and lighter.

Accordingly, this embodiment makes use of the idea of minimizing the distance from the center of the motor up to the smallest outer diameter (Y in FIG. 14) of the stator core yoke when the spindle motor 2 is configured. The embodiment of FIG. 14 also seeks to minimize the radial length, which is dependent on thickness of the bridge portion formed by the straight part 9C of the yoke 10. If the thickness of the bridge is decreased too much, however, magnetic saturation may arise, thus causing a cogging torque to develop. Consequently, the thickness of the bridge should preferably be reduced such that the magnetic flux flowing therethrough remains unsaturated (the spindle motor and the head driving actuator do not magnetically interfere with each other) and still stay at a minimum value. In order to arrange a spindle motor which is able to meet the requirements above with the bridge as thick as thus desired, the stator should preferably be of multipole construction and preferably be of 8-pole construction. Moreover, the upper limit of the thickness of the bridge (i.e. yoke part 9C) should preferably be 2 mm or less.

The effect described above may further be improved by setting the ratio between the length from the center of the motor of the spindle motor 2 to the large inner diameter of the stator core and the length therefrom to the small inner diameter, thereof to be as high as possible. The ratio shown in the example of FIG. 14 is set at $\frac{1}{3}$ or less, the ratio being between the length from the center of the rotor of the spindle motor 2 to the large inner diameter of the curved part 9B of the yoke stator and the length therefrom to the small inner diameter thereof.

Another embodiment of the present invention shown in FIG. 16 will now be described.

Both the spindle motor 2 and the head driving actuator 12 are constructed in the form of rotary permanent magnet brushless motors in this embodiment. In addition, the stator yokes forming the magnetic circuits of the spindle motor 2 and the head driving actuator 12.

Thus, the stator yoke of the spindle motor comprises a curved part 9B and a short-circuit part 9C, and the yoke of the head driving actuator 12 has a short-circuit part 9D and a curved part 9E. The two short-circuit parts 9C, 9D are connected together, as are the curved parts 9B, 9E. As a result, the resultant integral yoke surrounds both the rotor of the spindle motor and the rotor of the head driving actuator.

Thus, the head driving actuator 12 and the spindle motor 2 are substantially similar in construction. In particular, the moving element 19, the stator cores 23A and the coils 24 are similar in construction to those illustrated with reference to the spindle motor 2. However, the spindle motor 2 and the head driving actuator 12 are not limited in configuration to those shown in FIG. 16 and these may only be arranged with a plurality of motors using the same stator core.

In FIG. 16, the moving element 19 of the head driving actuator 12 is coupled to the head 11 via a coupling element 25 and moves the head 11 over a curved locus as shown. The head driving actuator 12 operates as a permanent magnet brushless motor movable over a finite angle. Moreover, by design of the stator yoke of the head driving actuator 12 and as the outer shape may be provided space where the head 11 is to be moved. It is possible to form a disk drive unit suitable for a small thin, lightweight, reliable disk unit and a motor unit having a plurality of drive motors suitable for the disk drive unit.

The head driving actuator 12 is only needed to operate as the permanent magnet brushless motor movable over a finite angle. Hence one pair of N and S permanent magnets 22 on the head side 11 of the moving element 19 become unnecessary, and so is the part of the stator core 9D adjacent the head side 11. For instance, the construction may be made smaller and lighter on the assumption that the moving element yoke 21 and the head are directly coupled with the coupling element 25

Although the head 11 has been so arranged as to be directly driven in the embodiment shown, it may be driven via a power transmission mechanism such as a gear.

Even when electrostatic motors are applied to the driving of the spindle motor 2 and the head feeding actuator 12, though not shown, their electrodes for generating drive force may be formed integrally on the same board. The same effect as described above may be achievable by the disk drive unit.

Although the spindle motors of the embodiments of the present invention described above all make use of a brushless motor that employs permanent magnet rotor, a reluctance motor with magnetic poles on the rotor may also be used in the same construction to achieve the object of this invention for a disk apparatus.

Since embodiments of the present invention enable a part of the outer periphery of a spindle motor, which directly drives the disk, to be closer to the rotor center than the inmost circumference of the disk recording portion, it is possible to put the head driving actuator close to the disk center, reducing the size and thickness of the disk drive apparatus.

Since the outer circumference of the motor on the head driving actuator side may be magnetically shielded by a short,circuit yoke, it has no opening, either structural or magnetic. This in turn improves the head reliability and reduces the pulses in motor rotation, improving the currency of speed control.

Position information recorded over the entire periphery of the disk may be used to determine the actual speed rotation of the rotor, which in turn is used for speed control of the spindle motor. This position information improves the resolution of the speed information, thereby enhancing the precision of the speed control.

Since the brushless motor incorporating a permanent magnet rotor may be used for a spindle motor, a part of the magnetic flux generated by the permanent magnets of the rotor can be utilized for holding the disk. This eliminates the need for a dedicated disk holding device, reducing the weight and thickness of the disk apparatus.

According to the embodiments of the present invention shown in FIGS. 13 to 25, at least one of these groupings including the magnetic materials, the coils, the electrodes and the piezoelectric elements used to form the drive-torque generating parts for driving the disk and the actuator for driving the head are integral. Consequently, the components can be adapted for only common use and also integration and this contributes to an improvement in assembly accuracy. The disk drive unit and the motor unit having the plurality of motors can effectively be made smaller, thinner, lighter and more reliable.

What is claimed is:

1. A disk drive unit comprising a rotatable support for a disk, a head for performing at least one of recording, reading and erasing information on said disk and a motor for rotating said rotatable support about a rotation axis;
    said motor having a stator and a rotor rotatable about said rotation axis;
    wherein the stator includes means for generating magnetic fields for rotating said rotor about said rotation axis and a yoke extending continuously completely around the rotor about said rotation axis, said yoke having an outer periphery which extends completely around said rotor and said rotation axis, and wherein said rotor comprises at least one permanent magnet and is located inside said yoke, as seen in a cross section of said motor taken perpendicular to said rotation axis and through said rotor and said yoke with said rotor and rotation axis being positioned inside said yoke as seen in said cross section with said rotation axis closer to a first part of said outer periphery of the yoke than to a second part of said outer periphery of the yoke and wherein said head is located adjacent said first part of said outer periphery of the yoke, and wherein said means for generating magnetic fields includes a plurality of coils located in said motor between the outside of said rotor and an inner periphery of said yoke as seen in said cross section.

2. A disk drive unit according to claim 1, wherein said first part of the outer periphery of said yoke, as seen in said cross section, is a short-circuit part of said yoke and said second part of the outer periphery of said yoke is a curved yoke part connected to said short-circuit part, said plurality of coils being located between the outside of said rotor and an inner periphery of said curved yoke part as seen in said cross section.

3. A disk drive unit according to claim 1, wherein said disk drive unit further comprises an actuator for moving said head with respect to said rotation axis, said actuator being located beyond said outer periphery of said yoke adjacent to said first part of said outer periphery.

4. A disk drive unit according to claim 3, wherein said actuator is arranged to move said head along a predetermined locus path, and an extension of said predetermined locus path intersects said first part of said outer periphery of said yoke.

5. A disk drive unit according to claim 1, wherein:
    said disk has a region of magnetic material, and wherein direct magnetic interaction is generated between said at least one permanent magnet and said region of said disk, whereby said direct magnetic interaction provides a holding force for holding said disk on said rotatable support.

6. A disk drive unit according to claim 1, said disk drive unit further comprises an actuator for moving said head with respect to said rotation axis, said actuator comprising a movable part and a fixed part, said fixed part having another means for generating magnetic fields for driving said movable part and another yoke supporting said other means;
    wherein said yoke of said motor and said other yoke of said actuator are integral.

7. A disk drive unit according to claim 1, wherein said disk is a magnetic disk, and wherein said disk drive unit further comprises a magnetic shielding member spaced between said motor and at least a part of said disk.

8. A disk drive unit having a rotatable support for a disk and a motor for rotating said rotatable support about a rotation axis;
    said motor having a stator with means for generating magnetic fields and a rotor rotatable about said rotation axis, said stator including a yoke extending continuously completely around said rotor about said rotation axis, said yoke having an outer periphery which extends completely around said rotor and said rotation axis, and said rotor being located inside said yoke, as seen in a cross section of said motor taken perpendicular to said rotation axis and through said rotor and said yoke with said rotor and said rotation axis being positioned closer to a first part of said outer periphery of the yoke than to a second part of said outer periphery of the yoke, said rotor comprising at least one permanent magnet and being driveable for rotation about said rotation axis by the interaction of magnetic fields generated by said means for generating of said stator with at least one permanent magnet;
    said disk having a region of magnetic material for direct magnetic interaction between said at least one permanent magnet and said region of said disk, whereby said direct magnetic interaction provides a holding force for holding said disk on said rotatable support; and wherein said means for generating magnetic fields includes a plurality of coils located in said motor between the outside of said rotor and an inner periphery of said yoke as seen in said cross section.

9. A disk drive unit according to claim 8, wherein said first part of the outer periphery of said yoke, as seen in said cross section, is a short-circuit part of said yoke and said second part of the outer periphery of said yoke is a curved yoke part connected to said short-circuit part, said plurality of coils being located between the outside of said rotor and an inner periphery of said curved yoke part as seen in said cross section.

10. A disk drive according to claim 8, wherein said at least one permanent magnet has a height in a direction of said rotation axis greater than the height of said yoke in said direction.

11. A disk drive unit according to claim 8, wherein said region of said disk is proximate a center of said disk.

* * * * *